United States Patent Office 2,928,591
Patented Mar. 15, 1960

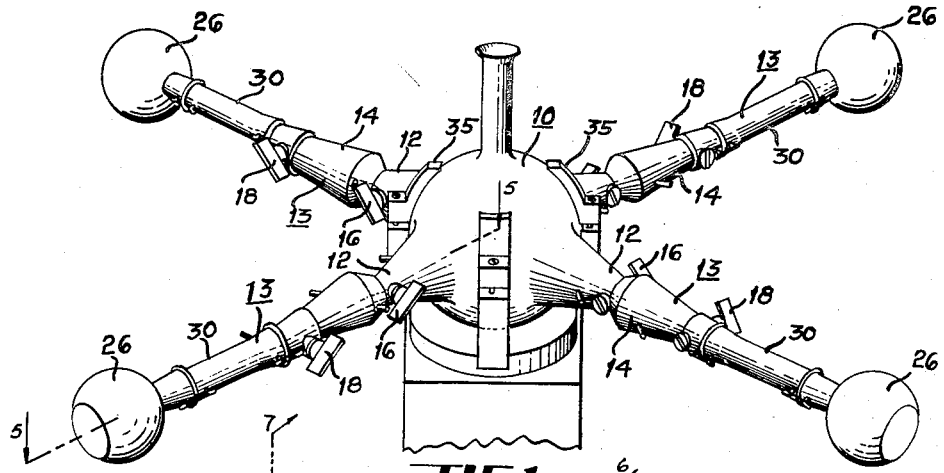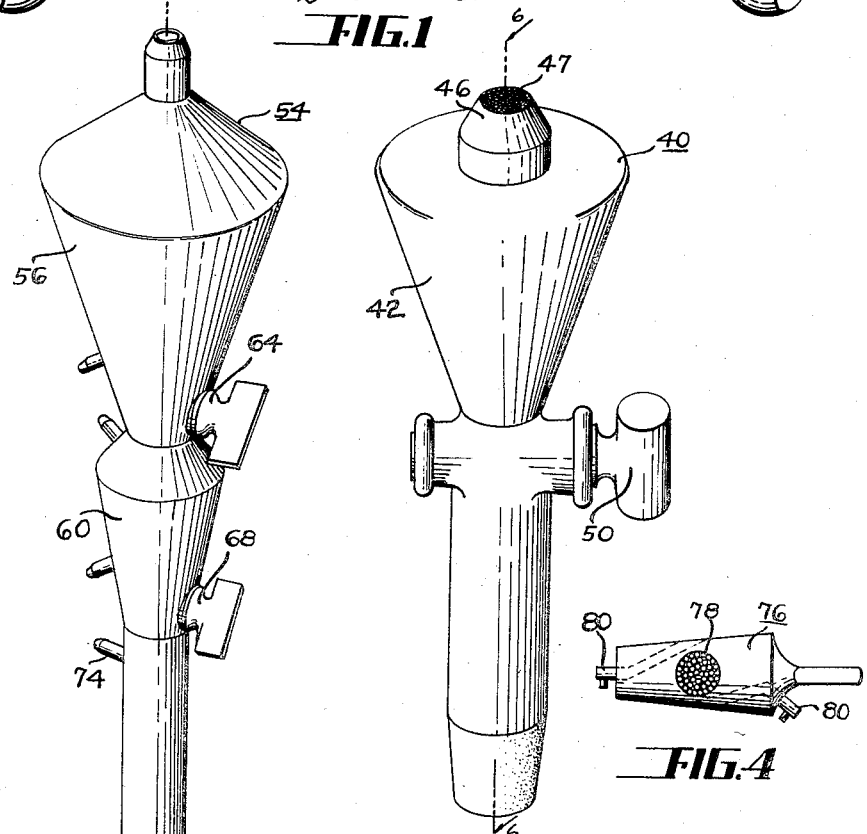

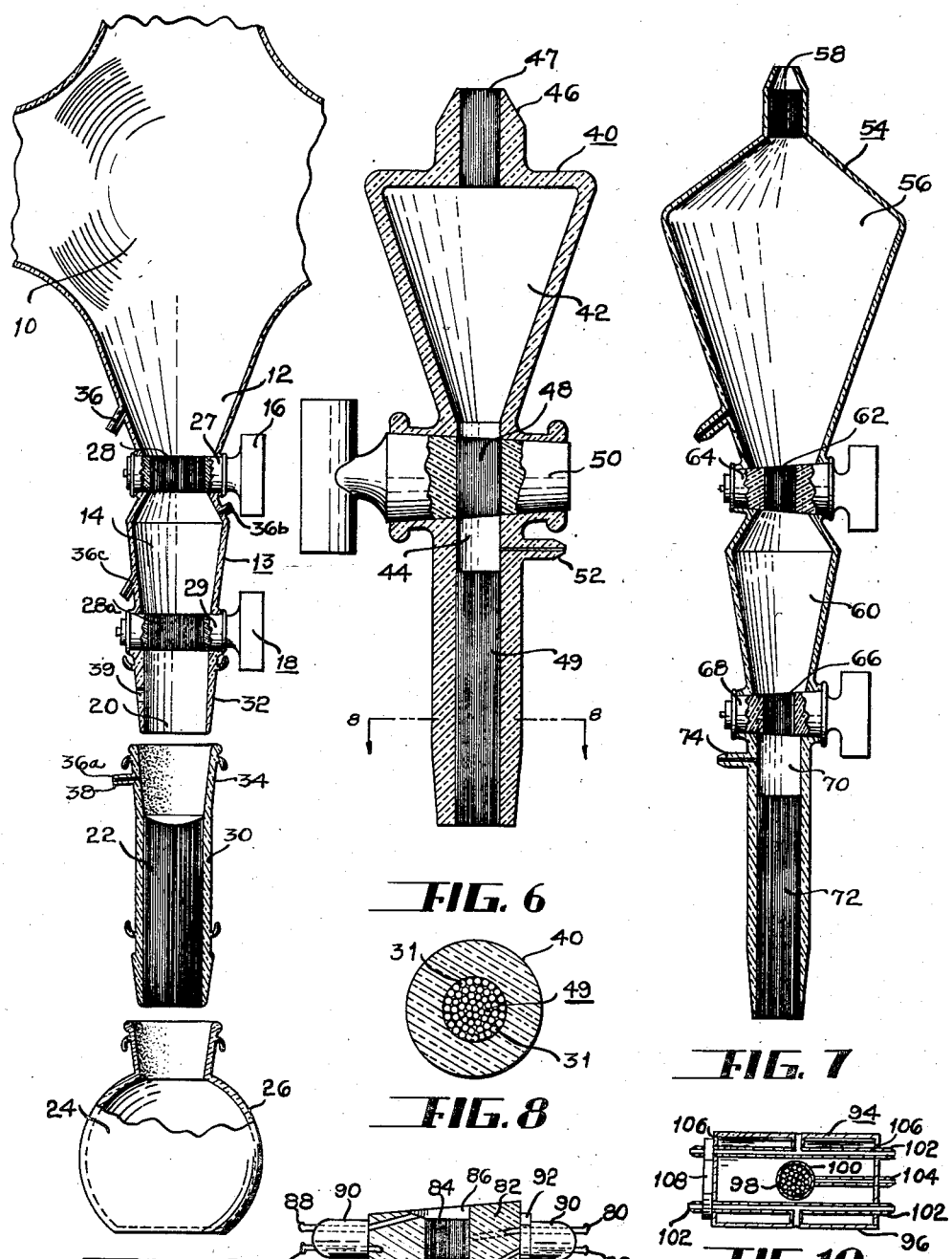

2,928,591

METHOD AND APPARATUS FOR SEPARATING PARTICLES IN A FLUID DISPERSION

George Lee Deaver, Columbus, Ohio

Application December 27, 1956, Serial No. 630,857

22 Claims. (Cl. 233—2)

This invention relates to a method and apparatus for separating particles in a fluid dispersion into groups according to their specific gravities and, more particularly, for separating the corpuscular particles in whole blood.

In recent years much effort has been directed toward developing means for separating various particles found in whole blood. Even so, the methods for doing this which are presently commercially available are time consuming and, for the most part, capable of handling only small quantities of blood. An object of this invention is to provide a method for rapidly separating particles dispersed in a fluid medium, the particles separating according to their specific gravities.

Another object of this invention is to provide the apparatus for carrying out the aforesaid object.

Another object of this invention is to provide a centrifuge apparatus for separating whole blood into its various components.

Still another object is to provide an improved centrifuge apparatus for removing particulate or corpuscular matter from a fluid dispersion.

Another object of this invention is to provide a particle separating device wherein capillary tubes increase the rapidity of separation.

Another object of this invention is to provide a particle separating device wherein a column of fluids of varying specific gravity is employed to separate particles.

A further object of this invention is to provide a novel stopcock including a capillary filter for use in particle separation.

Still another object of this invention is to provide a novel stopcock valve having flush ports extending therethrough for clearing the capillary filter therein.

Other objects and advantages reside in the construction of parts, the combination thereof and the mode of operation, as will become more apparent from the following description.

The efforts leading to the present invention have been confined primarily to a search for means for separating blood into its various components. However, the principles developed as a result of this research are applicable as well to other problems wherein it is desired to separate particles according to their specific gravities.

In order to better understand the present invention, the mathematical principles concerning the rate of separation of solid particles in fluid dispersions are reviewed. To a first approximation, the rate of fall of a macroscopic solid particle in a fluid medium is given by the relationship, $R=(d_s-d_f)Vg$; where R is the rate of fall; $d_s$ is the specific gravity of the solid particles in the fluid dispersion; $d_f$ is the density of the fluid medium (gas or liquid); V is the volume of the particle; and g is the gravitational acceleration. In whole blood, for example, the volume (V) of the various particles dispersed in the plasma is so small that, with the accompanying effects of Brownian motion and perhaps protective colloid action provided by the plasma, the rate of settling (R) is small. Hence, the red and white corpuscles and the platelets dispersed in the blood plasma will only slowly settle out of the plasma.

Frequently, a centrifuge apparatus is employed to separate the corpuscular matter from the blood plasma. The centrifuge is, of course, a means for artificially increasing the gravitational acceleration (g) to hereby increase the rate of setting (R).

It is apparent from the equation stated above that if the specific gravity of the dispersing fluid $(d_f)$ is equal to the specific gravity of the dispersed particles $(d_s)$, the term $(d_s-d_f)=$zero and hence $R=0$ and no settling can take place, regardless of the volume of the particles (V) and regardless of the acceleration (g) applied. This condition is used in the present invention as a means for separating particles into groups of varying density. For example, if the particles in whole blood were dispersed in a cylinder containing an isotonic liquid, wherein the specific gravity of the liquid was graduated from top to bottom of the cylinder, the particles would settle within the cylinder at various levels according to the specific gravity of each particle. From a practical view point, although such a condition may be realized, the rate of settling with this technique is too small for effectively fractionating large quantities of whole blood.

Applicant has designed a centrifuge apparatus wherein fluids of different specific gravities may be arranged in a column and yet maintained apart from one another so as to provide a column of fluids of varying specific gravity. A capillary filter provides the means whereby particles of varying specific gravities may be rapidly separated into groups.

In the drawings,

Figure 1 is a perspective view of a centrifuge apparatus for use in separating the particles in whole blood.

Figure 2 is an enlarged perspective view of a modified centrifuge column.

Figure 3 is an enlarged perspective view of a second modification.

Figure 4 is a plan view of a stopcock filter valve carrying a capillary filter used in this apparatus.

Figure 5 is an enlarged sectional view, taken along the line 5—5 of Figure 1.

Figure 6 is a sectional view, taken along the line 6—6 of Figure 3.

Figure 7 is a sectional view, taken substantially along the line 7—7 of Figure 2.

Figure 8 is a sectional view, taken substantially along the line 8—8 of Figure 6.

Figure 9 is a sectional view of a modification of the stopcock filter valve shown in Figure 4.

Figure 10 is a sectional view of another modification of the stopcock filter valve shown in Figure 4.

Referring to the drawings in greater detail, a flask 10, shown in Figure 1, serves as a reservoir for whole blood in the centrifuge apparatus. Ports 12 protrude from this flask 10 to supply blood to centrifuge columns 13. The columns 13 comprise successively a first chamber 14, bounded by stopcocks 16 and 18, a second chamber 20, bounded by the stopcock 18 at one end and by a capillary filter 22 at the other end, and a third chamber 24, enclosed by the flask 26. Disposed within valves 27 and 29 of the stopcocks 16 and 18 are capillary filters 28 and 28a respectively, which are formed from a plurality of individual glass capillary tubes 31, as shown in section in Figure 8. The individual glass tubes are 75-100 microns in diameter. The tubes may be fused together within the stopcock by the application of heat or by any other suitable means, both the original capillary tubes and the interspaces providing capillary channels. The large capillary filter 22 is similarly fused within a glass tube 30. The capillary channels in the filter may, of course, be obtained by other means, as for example, drilling a large tube to provide holes and drawing the tube to reduce the diameter of the holes.

The column 13 formed by the first, second and third chambers may be broken at any desired points by ground glass joints, such as that shown at 32 and 34, in Figure 5. The selection of points at which ground glass joints are to be placed is a matter of choice, depending upon the needs for disassembling and cleaning the centrifuge apparatus. In the device of Figure 1, the centrifuge column 13 is integral with the flask 10 as far as the ground glass joint 32, 34, with the capillary filter 22 being entirely removable for cleaning purposes. By providing ground glass joints on either side of each stopcock, it would be possible to interchange the various parts of the column.

Provision is made in the apparatus for cleaning the individual capillary filters and for withdrawing liquids from the various chambers by placing capillary ports 36 at various points along the column. The location of the various capillary ports is again a matter of choice, depending upon the particular needs for the apparatus.

The second chamber 20 in the column 13 is actually the hollow of the ground glass joint 32, 34. A capillary port 36a is provided for this chamber by placing a capillary stem 38 on the outer joint member 34 and by placing a hole 39 in the inner joint member 32 for registration with the capillary stem. The particular port 36a may be closed at any time, merely by rotating the portions of the ground glass joint 32, 34 relative to one another, to move the hole 39 out of registry with the stem 38.

The apparatus is designed to be mounted upon a centrifuge table, the reservoir flask 10 being anchored directly over the center of rotation of the table. Clamps 35, adapted to grasp the flask 10, are provided for this purpose. The several columns protruding from the center flask 10 may be anchored to the table as desired.

In the operation of this device, the capillary ports 36 are first closed by suitable caps, not shown, then the flask 10 is filled with whole blood. The whole blood contains plasma having an average specific gravity of about 1.024, red blood corpuscles having an average specific gravity of 1.095, white blood corpuscles having an average specific gravity of 1.059 and platelets having an average specific gravity of 1.029. The diameter of the particles in the blood ranges from three microns for the platelets to an average of fifteen microns for the white corpuscles. An isotonic solution, which may be albumin, of specific gravity 1.029, is placed in the first chamber 14. A similar isotonic solution of specific gravity 1.059 is placed in the second chamber 20. In the flask 26 enclosing the third chamber 24 is placed a third isotonic solution having a specific gravity 1.095. The capillary filter 28 in the stopcock 16 is charged with the same solution placed in chamber 14. Similarly, the capillary filter 28a in the stopcock 18 is charged with the solution placed in the chamber 20. The capillary filter 22 above the flask 26 is charged with an isotonic solution having a specific gravity 1.080.

The apparatus is then whirled at high speed upon the centrifuge table, accelerating the particles in the whole blood out of the flask 10 and through the columns 13 extending from the flask 10. The red blood corpuscles will travel through the entire column 13 to the chamber 24 which contains a solution having a specific gravity equal approximately to that of the red blood corpuscles. The white blood corpuscles will travel through the column to the chamber 20 which contains a solution having specific gravity equal approximately to that of the white corpuscles. They will not travel through the filter 22, since the specific gravity of the liquid in this filter 1.080 is greater than that of the white blood cells 1.059. The platelets will travel only through the first capillary filter in the stopcock 16 to the chamber 14. They can travel no further through the column, since they are stopped at the second capillary in the stopcock 18 by the solution therein, which has a higher specific gravity than that of the platelets. The plasma, unable to travel through the filter 28, remains in the flask 10.

The time required for separation of the red and white corpuscles from a liter of blood in the flask 10 is approximately three minutes. This compares with the time of thirty minutes required for separation of similar quantities of blood with apparatus presently commercially available. The centrifuge must be operated for longer times, however, to remove a substantial fraction of the platelets from the plasma.

The column 13 is emptied after the centrifuge operation in the following manner; first, the stopcocks 16 and 18 are closed, so that the capillary filters therein are no longer in parallel relation to the column. This shuts off the chamber 14. The chamber 14 is emptied by introducing air, or any other suitable fluid, into the chamber through the capillary port 36b, forcing the liquid containing dispersed platelets through the capillary port 36c. The chamber 20 is next emptied by turning the stopcock 18, so that the capillary filter therein is in parallel relationship to the column 13 and air is again forced through the capillary port 36b, the fluid in the chamber 30 draining through the capillary stem 38. The flask 26 is next emptied by separation from the column at the ground glass joint.

The relative sizes of the chambers 14, 20 and 24 may be varied in any desirable manner. The sizes shown in Figures 1 and 5 have evolved as a matter of design convenience.

It will be noted in Figure 5 that the walls of the chamber 14 are slanted as in a cone. This shape is provided so that particles being accelerated through the column will not be obstructed in outward travel by the walls of the chamber 14, which is larger in cross section than the remainder of the column 13.

Two modifications of this device are shown in Figures 3 and 6 and Figures 2 and 7. The modified column 40, shown in Figures 3 and 6 is designed for separation of red and white corpuscles from whole blood on a smaller scale. The first chamber 42 of the column 40 corresponds in function to the flask 10 in the preferred embodiment. Similarly, the second chamber 44 of the column 40 corresponds in function to the second chamber 20 of column 13. The third chamber in both the preferred embodiment and the column 40 is provided with a flask, such as that shown at 26.

A capillary port 47 is provided in the hollow of a stem 46 at the top of the chamber 42. A first capillary filter 48 is provided in the stopcock filter valve 50 intermediate the chambers 42 and 44. A second capillary filter 49 is fused within the column 40 below the second chamber 44. It will be noted that this arrangement provides a unitary column as opposed to the two piece column 13 illustrated in connection with the embodiment of Figures 1 and 5.

In the operation of this modification, whole blood is introduced into the chamber 42 through the capillary port 47 which facilitates filling and serves to keep foreign matter out of the chamber 42. An isotonic solution of specific gravity 1.059 is introduced into the chamber 44 and the filter 48. A capillary port 52 passing through the wall of the chamber 44 is capped by suitable means, not shown, to prevent leakage of fluid within this chamber out of the column 40. An isotonic solution of density 1.095 is introduced into the flask, which is attached to the bottom of the column 40. An isotonic solution of specific gravity 1.080 is introduced into the filter 49. The column 40 may then be placed in a conventional centrifuge provided with cups into which test tubes, or the like, may be inserted, the column 40 being inserted with suitable adapters, as would be a test tube. As the column 40 is centrifuged, red corpuscles travel from the chamber 42 to the bottom flask and white cells travel from the chamber 42 to the chamber 44.

Following the centrifuge operation which takes about three minutes, the separated fractions are removed from the column 40 in the following manner. First, the liquid containing white corpuscles in chamber 44 and filter 48 is evacuated by suction through the capillary port 52 provided in the wall of the chamber 44. As this liquid is withdrawn, the plasma, containing platelets, which was initially in the chamber 42 flows under gravity into the filter 48 and the chamber 44, the operator interrupting the withdrawal of fluid when substantially all of the white corpuscles have been withdrawn. Subsequently, the plasma and platelets may be withdrawn through the same port 52. Finally, the red corpuscles are obtained from the bottom flask by opening the adjacent ground glass joint.

It is apparent that the column 40 of Figures 3 and 6 may be used also for merely separating the red and white corpuscles from the plasma and platelets by placing an isotonic solution of specific gravity 1.04, for example, throughout the column 40 below the chamber 42. During the centrifuge operation, both the red and white corpuscles will then be accelerated into the bottom flask.

The modified column 54 shown in Figures 2 and 7 is also designed for insertion into a standard centrifuge apparatus having cups into which a test tube or the like may be inserted. In this modification, whole blood is introduced into a reservoir chamber 56, through a capillary port 58. As in the preferred embodiment, a second chamber 60 is filled with an isotonic solution of specific gravity 1.029, a third chamber 70 is filled with an isotonic solution of specific gravity 1.059, and a flask, such as the flask 26, filled with an isotonic solution of specific gravity 1.095 is attached to the lower end of the column with a ground glass joint. Similarly, a capillary filter 62, disposed in a stopcock valve 64, is filled with an isotonic solution of specific gravity 1.029, a capillary filter 66, disposed in a stopcock valve 68, is filled with an isotonic solution of specific gravity 1.059, and a filter 72, disposed intermediate the chamber 70 and the flask 26, is filled with an isotonic solution of specific gravity 1.080.

Platelets are centrifuged into the chamber 60, white corpuscles into the chamber 70 and red corpuscles into the flask at the bottom. Thus, the operation of the column shown in Figure 7 is identical to that shown in Figure 5. The fluids in the various chambers may be removed from the column of Figures 2 and 7 in a manner similar to that employed for the column in Figures 3 and 6, through a capillary port 74 extending into the second chamber 70.

Figure 4 shows a modified filter valve 76 which may be used in any of the centrifuge columns outlined in the above paragraphs. In the filter valve 76 a capillary filter 78 is provided along with capillary ports or channels 80. The ports 80 replace functionally the capillary ports 36 shown in the preferred embodiment of Figure 5. In the operation of the filter valve 76 for centrifuging, the capillary filter 78 is positioned parallel to the column in which it is employed. When it is desired to drain either chamber adjacent the filter valve 76, the valve is rotated so that the capillary ports 80 are connected into the adjacent column. Any suitable fluid may then be forced through the capillary port 80 to flush the chambers connected thereto. The filter valve 76, having capillary ports 80 integral therewith, has the advantage that the cost of the construction of a column such as that shown in Figure 5 is considerably reduced, it being unnecessary to provide the capillary ports 36. The ports 80 may also be interconnected to bypass the capillary filter 78.

A second modified filter valve 82, containing a capillary filter 84, is illustrated in Figure 9. It will be noted that the capillary filter 84 in this modified filter valve does not extend to the full diameter of the filter valve. This provides for small pockets 86 at each end of the capillary filter 84. Connecting to these small pockets 86 are capillary ports 88, which may be used to drain the pockets and flush the capillary filter 84. The ports 88 may also be used to recharge the capillary filter 84 with any desired fluid, the recharging operation being effected when the filter is in a non-parallel relationship with respect to the column, so as not to disturb any fluids in the column. As in the first modification of Figure 4, additional capillary ports 80 may be provided in the filter valve 82 to provide for drainage of the chambers adjacent the stopcock carrying the valve 82. In the filter valve 82 the conventional handle has been replaced with cylindrical projections 90 extending from either side of the filter valve, which projections provide a rigid support for the capillary ports 88 and 80. The filter valve 82 is designed to be rotated with a wrench (not shown) engaging a glass hex nut 92 fused to one side of the filter valve.

In Figure 10, a third modified filter valve 94 is illustrated. The filter valve 94 is formed from a hollow glass cylinder 96, the outer surface of which is ground to fit within a suitable stopcock. Extending diametrically across the cylinder 96 is a hollow tube 98, into which is fitted a capillary filter 100. Oppositely disposed hollow T-shaped tubes 102 are joined to the walls of the glass cylinder 96, the T-shaped tubes 102 replacing in function the capillary ports 80 of Figure 4. The tubes 102 may be of capillary dimensions, or may be larger than capillary dimensions, each leg having therein a plurality of capillary tubes fused together to provide a capillary filter (not shown). As in the modification of Figure 9, additional tubes 104 may be joined at either or both ends of the tube 98 to provide for flushing of the capillary filter 100 therein.

The filter valve 94 of Figure 10 has the advantage of light weight for use in centrifuge operations. A further advantage accrues from the ease with which the oppositely disposed tubes 102 may be interconnected to provide a by-pass channel for by-passing the filter 100. The filter valve 94 may be filled with any suitable light weight material, such as paraffin, so as to reduce the opportunity for breakage of the tubes 102 and 104. Additional support for the tubes 102 and 104 may be obtained by sealing glass discs 106 to the ends of the valve 94. A glass hex nut 108 is provided for rotating the valve 94.

The specific gravities of the solutions placed in the centrifuge colums herein described were chosen for the purposes of illustration only. It is apparent that many other combinations of specific gravities may be used to obtain the desired results. For example, the table below, produced with reference to Figures 1 and 5, illustrates two combinations which will provide the desired separation of platelets, white corpuscles and red corpuscles from whole blood.

| Chamber or Filter | Specific Gravity Therein (A) | Specific Gravity Therein (B) |
| --- | --- | --- |
| First Filter 28 | 1.00 | 1.00 |
| First Chamber 14 | 1.04 | 1.029 |
| Second Filter 28a | 1.00 | 1.04 |
| Second Chamber 20 | 1.07 | 1.059 |
| Third Filter 22 | 1.00 | 1.08 |
| Flask 26 | 2.00 | 1.095 |

Clearly, combination (A) will produce a separation wherein the platelets, white cells and red cells will float above their respective collection chambers and combination (B) will produce a separation wherein the platelets, white cells and red cells will be dispersed within their respective collection chambers. It is, of course, not essential that the specific gravity of the liquid be exactly that of the particles to be trapped in a dispersion. Approximate correspondence of specific gravities is sufficient.

It will become obvious to any one skilled in the art that there are many other applications for a device such as this. For example, it may be desired only to separate all of the particles in whole blood from the plasma, so as to obtain specimens of pure plasma. When this is desired, only one capillary filter need be used, the filter being disposed between two chambers, one containing the whole blood and one containing an isotonic liquid, which may be of either higher or lower specific gravity than that of the plasma. The only limitation is that the specific gravity of the isotonic solution be less than that of the platelets. When such a column is centrifuged, the corpuscular matter in the whole blood will travel through the capillary filter, thus separating from the plasma.

In other applications, it may be desired to merely obtain a particle density distribution from a dispersion of particles in a gas or liquid medium. In such an application, a plurality of chambers interconnected with capillary filters may be provided in a column, the chambers being filled with gas or liquids of varying specific gravities. When the dispersion is placed above the column and centrifuged, particles will orient themselves in the column according to their specific gravities and the particle distribution thereby obtained.

In this description, frequent reference has been made to the terms "capillary port" and "capillary filter." The term "capillary port" is employed to designate either a port which is of capillary dimensions or a port into which has been fused a plurality of capillary tubes. Capillary ports are employed in the present invention to provide a means whereby fluid flow can be accurately controlled.

The term "capillary filter" refers to a filter formed by fusing together a plurality of capillary tubes. This arrangement is termed a filter for the reason that in the present use, the capillary filter functions to permit the passage of particles therethrough, while impeding the intermixture of fluids placed on either side of the filter. The explanation for the behavior of such a filter is not yet known, it having been observed, for example, that the mere presence of capillary tubes in an ordinary centrifuge cell will enhance the operation of this centrifuge. It appears that the efficiency of the capillary filter increases with the length of the filter. Thus, the filter 22 in the preferred embodiment has been shown as a long filter, so that the separation of the red cells, which must travel farthest through the column, is accelerated.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

Having thus described my invention, I claim:

1. The method of separating particles in a fluid dispersion into groups of differing specific gravities, comprising the steps of placing the fluid dispersion at one end of a column having therein a plurality of aligned chambers, placing in the chambers fluids of varying specific gravities covering the range within which a particle separation is to be effected, the fluids being oriented within the column in order of increasing specific gravity, the fluid of highest specific gravity being placed at one end of the column opposite the fluid dispersion, placing a filter intermediate each pair of adjacent chambers, the filters each having a passage therethrough which is of capillary dimensions, while impeding the passage of fluids therethrough, and centrifuging the column so as to accelerate the particles in the fluid dispersion toward the opposite end of the column.

2. The method of separating the corpuscular matter in whole blood into groups according to specific gravity comprising the steps of placing the whole blood at one end of a column having therein a plurality of aligned interconnected chambers, placing in the chambers liquids of varying specific gravity covering the range within which separation of the corpuscular matter is to be effected, the liquids being oriented within the column in order of increasing specific gravities, the liquid of highest specific gravity being placed at the end of the column opposite the liquid dispersion, placing a filter intermediate each pair of adjacent chambers, the filters each having at least one passage therethrough which is of capillary dimensions, and centrifuging the column so as to accelerate particles out of the whole blood and through the column toward the opposite end of the column.

3. The method of separating particles in a liquid dispersion into groups of varying specific gravities, comprising the steps of placing the liquid dispersion at one end of a column having therein a plurality of interconnected aligned chambers, placing in the chambers liquids of varying specific gravities covering the range within which particle separation is to be effected, the liquids being oriented within the column in order of increasing specific gravities, the liquid of highest specific gravity being placed at the end of the column opposite the liquid dispersion, said liquids being chemically inert with regard to the dispersed particles, placing a filter intermediate each pair of adjacent chambers, the filters each having at least one passage therethrough which is of capillary dimensions, and centrifuging the column so as to accelerate particles out of the liquid dispersion through the column toward the opposite end of the column.

4. The method of separating particles in a liquid dispersion into groups of varying specific gravities comprising the steps of placing the liquid dispersion at one end of a column having therein a plurality of interconnected aligned chambers, placing in the chambers liquids of varying specific gravities covering the range within which separation of particles is to be effected, the liquids being oriented in order of increasing specific gravity, the liquid of highest specific gravity being placed at the end of the column opposite the liquid dispersion, placing a filter intermediate each pair of adjacent chambers, the filters each having at least one passage of capillary dimensions extending therethrough and interconnecting the chambers adjacent thereto, and centrifuging the column so as to accelerate particles out of the liquid dispersion through the column toward the opposite end of the column.

5. The method of separating the corpuscular matter of whole blood into groups according to the specific gravities of the corpuscular matter, comprising the steps of placing the whole blood containing platelets, white corpuscles, and red corpuscles in a first chamber at one end of a column having therein four interconnected aligned chambers, placing in the second of said chambers an isotonic liquid having a specific gravity comparable to that of the platelets, said second chamber being adjacent the first chamber, placing in the third of said chambers an isotonic liquid having a specific gravity comparable with that of the white corpuscles, said third chamber being adjacent said second chamber, placing in the fourth chamber an isotonic liquid having a specific gravity comparable to that of the red corpuscles, said fourth chamber being adjacent said third chamber and at the opposite end of the column from the whole blood, placing filter means intermediate each pair of adjacent chambers, the filters each having passages extending therethrough which are of capillary dimensions, and centrifuging the column so as to accelerate the corpuscular matter out of the whole blood and through the column toward the opposite end of the column.

6. The method of separating the corpuscular matter of whole blood into groups according to the specific gravities of the corpuscular matter, comprising the steps of placing whole blood containing platelets, white corpuscles and red corpuscles in a first chamber at one end of a column having therein four interconnected aligned chambers, placing in the second of said chambers an isotonic liquid having a specific gravity comparable to that of the platelets, said second chamber being adjacent the first chamber containing whole blood, placing in the third chamber an isotonic liquid having a specific gravity comparable with that of the white corpuscles, said third chamber being adjacent said second chamber, placing in the fourth chamber an isotonic liquid having a specific gravity comparable to that of the red corpuscles, said fourth chamber being adjacent said third chamber and at the opposite end of the column from the whole blood, placing filters intermediate each pair of adjacent chambers, the filters each having passages extending therethrough which are of capillary dimensions and centrifuging the column so as to accelerate particles out of the whole blood and through the column toward the opposite end thereof, the red corpuscles accumulating in said fourth chamber, the white corpuscles accumulating in said third chamber and the platelets accumulating in said second chamber.

7. A centrifuge apparatus for the separation of particles from a fluid dispersion, the particles being separated according to specific gravities, said apparatus comprising a reservoir flask for containing said fluid dispersion, the flask being adapted to rotate about a central axis thereof, at least one centrifuge column protruding therefrom, said column having therein a plurality of linearly aligned chambers, and a plurality of capillary filters disposed within said column, there being one capillary filter intermediate each pair of adjacent chambers, each capillary filter having at least one capillary tube extending therethrough.

8. A centrifuge apparatus for the separation of particles in a fluid dispersion into groups according to specific gravity, said apparatus comprising a reservoir flask for containing the fluid dispersion adapted to be rotated about a central axis thereof, at least one centrifuging column protruding therefrom, said column having therein a plurality of linearly aligned interconnected chambers, a plurality of filters disposed within said column, there being one said filter intermediate each pair of adjacent chambers, each filter having passages extending therethrough which are of capillary dimensions.

9. A centrifuge apparatus for the separation of particles in a liquid dispersion into groups according to specific gravity, said apparatus comprising a reservoir flask for containing said liquid dispersion adapted to be rotated about a central axis thereof, at least one centrifuge column protruding therefrom, said column having therein a plurality of linearly aligned interconnected chambers, a plurality of filters disposed within said column, said filters each having passages extending therethrough which are of capillary dimensions, there being one said filter intermediate each pair of adjacent chambers, and port means for conveying liquids to and from each of the chambers.

10. A centrifuge apparatus for the separation of particles in a liquid dispersion into various groups according to specific gravity, said apparatus including a centrifuge column having a plurality of linearly aligned chambers therein, one of said chambers serving as a chamber for containing the liquid dispersion, and a plurality of capillary filters, there being at least one capillary filter intermediate each pair of adjacent chambers in said column, each said capillary filter having at least one capillary tube therein.

11. A centrifuge apparatus for the separation of particles from a liquid dispersion, said apparatus including a centrifuge column having a pair of linearly aligned chambers therein, one of said chambers providing a reservoir for said liquid dispersion, the other of said chambers providing a collection chamber for the particles separated from said dispersion, and a stopcock having a filter valve therein, a filter having passages of capillary dimensions disposed within said valve, said stopcock being disposed between the chambers of said column.

12. A rotatable filter valve for a stopcock, said valve having a substantially circular cross section and having a first channel therein extending normal to and passing through the axis of rotation thereof, a capillary filter disposed within said first channel, said capillary filter having at least one capillary tube extending therethrough, said valve having a second channel therein connecting from one end of said first channel to one end of said valve whereby fluids may be introduced into or removed from the fluid stream regulated by said stopcock.

13. A filter valve according to claim 12 wherein said second channel is of capillary dimensions.

14. A filter valve according to claim 12 wherein a plurality of capillary tubes are inserted into said second channel to provide a capillary filter therein.

15. A rotatable filter valve for a stopcock, said valve having a substantially circular cross section and having a first channel therein extending normal to and passing through the axis of rotation thereof, a capillary filter disposed within said first channel, said capillary filter having at least one capillary tube extending therethrough, said capillary filter having a length shorter than that of the first channel so as to provide pockets in said channel adjacent the opposite ends of said filter, said valve having means therein for flushing the capillary filter.

16. A filter valve according to claim 15 wherein the means for flushing the capillary filter includes a second channel extending from one end of said valve to the pocket at one end of said capillary filter, and a third channel extending from one end of said valve to the pocket at the other end of said capillary filter.

17. A rotatable filter valve for a stopcock, said valve having a substantially circular cross section and having a first channel therein extending normal to and passing through the axis of rotation thereof, a capillary filter disposed within said first channel, said capillary filter having at least one capillary tube extending therethrough, said capillary filter having a length shorter than that of said first channel so as to provide pockets in said channel adjacent the opposite ends of said filter, said valve having channel means therein for flushing the capillary filter, said valve having an aperture located on the periphery thereof aligned with and intermediate the ends of said first channel, said valve having a second channel extending from one end thereof to said aperture whereby fluids may be introduced into or removed from a fluid stream regulated by the stopcock.

18. The method of separating the red and white corpuscles of whole blood, comprising the steps of placing the whole blood containing white corpuscles and red corpuscles in a first chamber of a column having therein three interconnected aligned chambers, placing in a second chamber of said column an isotonic liquid having a specific gravity comparable to that of the white blood corpuscles, said second chamber being adjacent the first chamber, placing in a third chamber of said column an isotonic liquid having a specific gravity comparable with that of the red corpuscles, said third chamber being adjacent said second chamber, placing a filter intermediate each pair of adjacent chambers, the filters each having passages therein which are of capillary dimensions, and centrifuging the column so as to accelerate the corpuscular matter out of the whole blood and through the column toward the opposite end of the column.

19. The method of separating red and white corpuscles from whole blood, comprising the steps of placing whole blood containing white corpuscles and red corpuscles in a first chamber at one end of a column having therein two interconnected aligned chambers with a filter therebetween, said filter having passages therein which are of capillary dimensions placing in the second of said chambers an isotonic liquid having specific gravity comparable to that of the white blood corpuscles, and centrifuging the column so as to accelerate the red and white corpuscles out of the whole blood and through the filter means to the second chamber thereof.

20. A centrifuge apparatus for the separation of particles from a fluid dispersion, said apparatus comprising in linear alignment a reservoir flask, filter means, and a collection flask, the filter means being disposed intermediate the reservoir flask and the collection flask, said filter means having passages therein which are of capillary dimensions.

21. A centrifuge apparatus for the separation of particles from a fluid dispersion, said apparatus comprising in linear alignment a reservoir flask, a capillary filter, and a collection flask, the capillary filter being disposed intermediate the reservoir flask and the collection flask, said capillary filter comprising a plurality of capillary tubes extending between the collection flask and the reservoir flask.

22. The method of separating particles in a fluid dispersion into groups of differing specific gravities, comprising the steps of placing the fluid dispersion at one end of a column having therein a plurality of aligned chambers, placing fluids of varying specific gravities into the various chambers of the column, the fluids being oriented within the column in order of increasing specific gravity, the fluid of highest specific gravity being placed at the other end of the column, placing filters intermediate each pair of adjacent chambers, the filters each having parallel passages extending therethrough which are of capillary dimensions, and accelerating the particles in the fluid dispersion toward the opposite end of the column.

References Cited in the file of this patent

UNITED STATES PATENTS

| Number | Name | Date |
|---|---|---|
| 223,573 | Ainsworth et al. | Jan. 13, 1880 |
| 231,283 | Cushing | Aug. 17, 1880 |
| 456,242 | Ebert | July 21, 1891 |
| 591,394 | Fahy | Oct. 12, 1897 |
| 717,385 | Gathmann | Dec. 30, 1902 |
| 760,364 | Woolworth | May 17, 1904 |
| 780,334 | Freeman | Jan. 17, 1905 |
| 1,332,639 | Spaulding | Mar. 2, 1920 |
| 2,147,792 | Knight | Feb. 21, 1939 |
| 2,150,917 | Foulke et al. | Mar. 21, 1939 |
| 2,281,989 | Parfentjer | May 5, 1942 |
| 2,484,003 | Simison | Oct. 4, 1949 |
| 2,621,013 | Mansfield | Dec. 9, 1952 |
| 2,678,159 | Ellis | May 11, 1954 |
| 2,786,014 | Tullis | Mar. 19, 1957 |

OTHER REFERENCES

Tullis et al.: New Principle of Closed System Centrifugation, Science, vol. 124.

Tullis: Separation and Purification of Leokocytes and Platelets, The Journal of Hematology, September 1952, pp. 891–896.

UNITED STATES PATENT OFFICE

CERTIFICATE OF CORRECTION

Patent No. 2,928,591            March 15, 1960

George Lee Deaver

It is hereby certified that error appears in the printed specification of the above numbered patent requiring correction and that the said Letters Patent should read as corrected below.

Column 2, line 6, for "hereby" read -- thereby --; column 7, lines 68 and 69, strike out "while impeding the passage of fluids therethrough,".

Signed and sealed this 30th day of August 1960.

(SEAL)
Attest:

ERNEST W. SWIDER
Attesting Officer

ROBERT C. WATSON
Commissioner of Patents